(12) United States Patent
Funayama et al.

(10) Patent No.: US 10,611,303 B2
(45) Date of Patent: Apr. 7, 2020

(54) PORTABLE DEVICE AND VEHICLE

(71) Applicant: TOYOTA JIDOSHA KABUSHIKI KAISHA, Toyota-shi, Aichi-ken (JP)

(72) Inventors: Tomoyuki Funayama, Toyota (JP); Shigeki Nishiyama, Nagoya (JP); Toru Yoshihara, Miyoshi (JP); Masashi Komeya, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/249,368

(22) Filed: Jan. 16, 2019

(65) Prior Publication Data
US 2019/0275937 A1  Sep. 12, 2019

(30) Foreign Application Priority Data

Mar. 9, 2018  (JP) .................. 2018-042875

(51) Int. Cl.
*B60Q 9/00* (2006.01)
*H04W 4/02* (2018.01)
*H04W 4/48* (2018.01)

(52) U.S. Cl.
CPC .............. *B60Q 9/00* (2013.01); *H04W 4/027* (2013.01); *H04W 4/48* (2018.02)

(58) Field of Classification Search
CPC .......... B60Q 9/00; H04W 4/48; H04W 4/027; H04W 4/70; H04W 4/80
See application file for complete search history.

(56) References Cited

U.S. PATENT DOCUMENTS

2011/0146369 A1* 6/2011 Babala .................... B60T 8/885
                                                                                       73/1.38
2018/0099643 A1* 4/2018 Golsch .................... B60R 25/24

FOREIGN PATENT DOCUMENTS

JP        2016-000905 A      1/2016

* cited by examiner

*Primary Examiner* — Benyam Haile
*Assistant Examiner* — Mancil Littlejohn, Jr.
(74) *Attorney, Agent, or Firm* — Oliff PLC

(57) ABSTRACT

A portable device communicates with a vehicle, and the portable device includes: a motion sensor; a control unit configured to determine whether or not abnormality has occurred in the motion sensor, based on an output from the motion sensor; and an output unit configured to perform an output representing abnormality in the motion sensor, when the control unit determines that abnormality has occurred in the motion sensor.

4 Claims, 3 Drawing Sheets

PORTABLE DEVICE AND VEHICLE

BACKGROUND OF THE INVENTION

Field of the Invention

The present invention relates to a portable device that communicates with a vehicle and the like, and a vehicle.

Description of the Background Art

As an authentication system for vehicles, a smart entry system is known. In a smart entry system, an on-vehicle device authenticates a portable device held by a user through short-range radio communication, whereby the vehicle is capable of allowing, for example, a vehicle door or trunk to be unlocked and locked or a vehicle engine to be actuated by the user.

It is considered that a motion sensor such as an acceleration sensor is mounted to a portable device so as to detect motion of a user who holds the portable device, and an instruction input from the user who swings or taps on the portable device, for improving service of such a system. Japanese Laid-Open Patent Publication No. 2016-905 indicates that an acceleration sensor is mounted to a portable device to detect walking of a user.

In a case where a motion sensor is mounted to a portable device, if abnormality occurs in the motion sensor, the service is restricted. However, it is difficult to quickly specify that the restriction of the service is caused by abnormality in the motion sensor.

SUMMARY OF THE INVENTION

The present invention has been made in view of the aforementioned problem, and an object of the present invention is to provide a portable device and a vehicle which can quickly specify that abnormality has occurred in a motion sensor.

In order to solve the afore-mentioned problem, one aspect of the present invention is directed to a portable device that communicates with a vehicle, and the portable device includes: a motion sensor; a control unit configured to determine whether or not abnormality has occurred in the motion sensor, based on an output from the motion sensor; and an output unit configured to perform an output representing abnormality in the motion sensor, when the control unit determines that abnormality has occurred in the motion sensor.

Therefore, abnormality in the motion sensor can be detected to make notification thereof to the outside.

Furthermore, the motion sensor is capable of detecting an acceleration, and the control unit may determine that abnormality has occurred in the motion sensor in a case where a state where an absolute value of a difference between a magnitude of an acceleration detected by the motion sensor and a magnitude of a gravitational acceleration is greater than or equal to a predetermined value, continues for a first predetermined time period or longer time period.

The control unit may cause the motion sensor to perform a predetermined test operation in a case where an output from the motion sensor indicates that the portable device is stationary for a second predetermined time period or longer time period, and whether or not abnormality has occurred in the motion sensor may be determined based on a result of the test operation.

Therefore, abnormality in the motion sensor can be preferably determined.

Another aspect of the present invention is directed to a vehicle that communicates with a portable device including a motion sensor, and the vehicle includes: a communication unit configured to receive, from the portable device, information generated based on an output from the motion sensor; a control unit configured to determine whether or not abnormality has occurred in the motion sensor, based on the information received by the communication unit; and a notification unit configured to perform an output representing abnormality in the motion sensor in a case where the control unit determines that abnormality has occurred in the motion sensor.

Therefore, the vehicle can detect abnormality in the motion sensor and notify a user of the abnormality.

As described above, according to the present invention, the portable device, the vehicle, and the vehicle system can be provided which can detect, in a case where abnormality has occurred in the motion sensor, the abnormality and notify a user of the abnormality so that the abnormality can be quickly rectified and canceled.

DESCRIPTION OF THE PREFERRED EMBODIMENTS (Outline)

A portable device according to the present invention can detect abnormality in a motion sensor mounted to the portable device, and can notify a user of the abnormality. Therefore, when abnormality has occurred in the motion sensor, the abnormality can be quickly specified and rectified.

First Embodiment

A first embodiment of the present invention will be described below in detail with reference to the drawings.

<Configuration>

Figure 1:
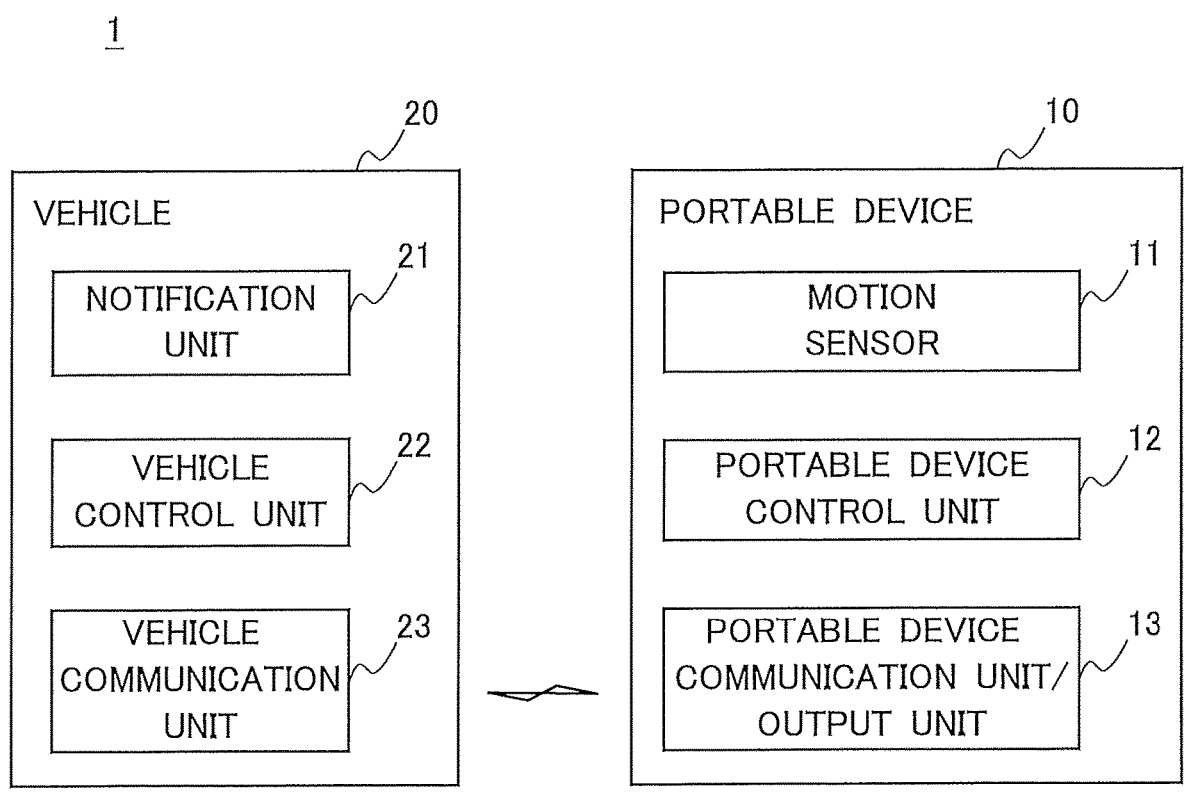
FIG. 1 is a functional block diagram illustrating a vehicle system according to each of a first and a second embodiments of the present invention.

FIG. 1 is a functional block diagram illustrating a vehicle system 1 according to the present embodiment. The vehicle system 1 includes a portable device 10 and a vehicle 20. The portable device 10 includes: a motion sensor 11, a control unit (portable device control unit) 12 that performs a process described below, based on the output from the motion sensor 11; and a communication unit (portable device communication unit) 13 that outputs information according to a result of the process performed by the control unit 12. The motion sensor 11 is typically an acceleration sensor. Based on the output from the motion sensor 11, for example, at least one of an acceleration, an angular velocity, an attitude angle, a speed, displacement, vibration, and the like of the portable device 10, or motion that is a temporal change pattern of them, can be specified. Thus, motion of a user who holds the portable device 10 or an operation, performed by a user, for swinging or tapping on the portable device, can be detected. The communication unit 13 has a function of performing wireless communication with the vehicle 20. As described below, the communication unit 13 may have a function of performing wireless communication with another portable device held by the user. Furthermore, the communication unit 13 may include, for example, a LED for notifying a user of information by using light or the like. Thus, the communication unit 13 may function as an output unit for outputting information in various formats to the outside of the portable device.

The vehicle 20 includes: a communication unit (vehicle communication unit) 23 that receives a radio signal transmitted from the communication unit 13 of the portable device 10; a control unit (vehicle control unit) 22 that performs a process based on the radio signal, and a notification unit 21 that makes notification to a user according to the result of the process.

<Process>

Figure 2:
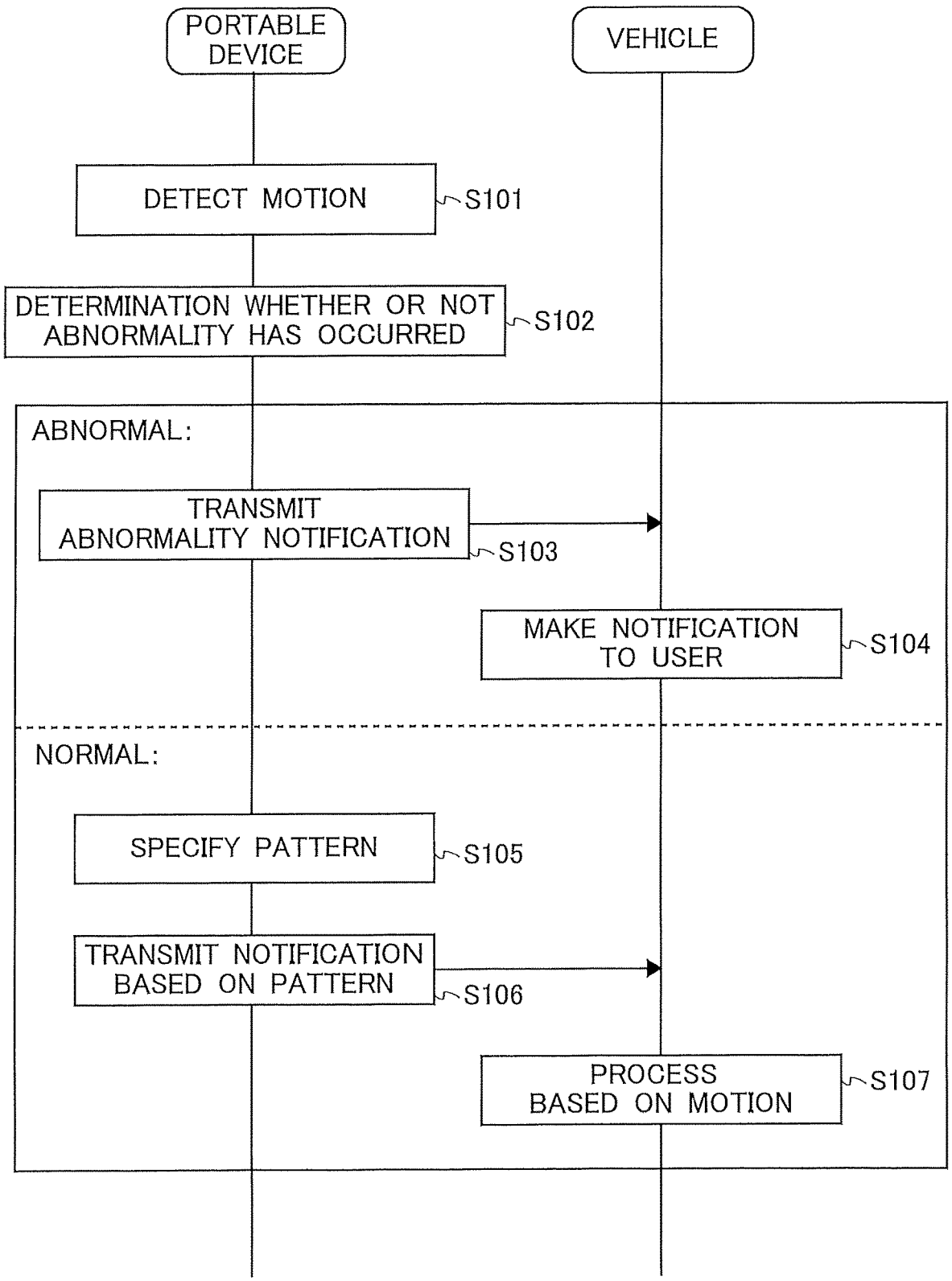
FIG. 2 is a sequence diagram illustrating a process according to the first embodiment of the present invention.

An example of the process according to the present embodiment will be described. FIG. 2 is a sequence diagram illustrating processes performed by the portable device 10 and the vehicle 20.

(Step S101): While the portable device 10 is operating, the control unit 12 of the portable device 10 monitors the output from the motion sensor 11 and detects the above-described motion of the portable device 10. In a case where, for example, the motion sensor 11 is an acceleration sensor, the control unit 12 determines that the motion has occurred when the direction and magnitude of an acceleration change so as to be greater than a predetermined threshold value, and can detect the motion based on the change pattern.

(Step S102): The control unit 12 of the portable device 10 determines whether or not the motion detected in step S101 is caused by abnormality of the motion sensor 11. For example, in a case where an output value from the motion sensor 11 represents a value which is unlikely to be generated in practice, the control unit 12 can determine that abnormality has occurred in the motion sensor 11. In a case where the output from the motion sensor 11 is an acceleration, when a state where a difference (absolute value) between the magnitude of the acceleration represented by the output value and the magnitude of the gravitational acceleration is greater than or equal to a predetermined value (for example, the output value is greater than or equal to 3 G) is continued for a predetermined time period (first predetermined time period) or longer time period, it can be preferably determined that abnormality has occurred in the motion sensor 11. Thus, whether or not the output value from the motion sensor 11 represents abnormality in the motion sensor 11 can be determined based on a predetermined criterion. In a case where it is determined that abnormality has occurred in the motion sensor 11, the process proceeds to step S103. Otherwise, it is determined that the motion sensor 11 is normal, and the process proceeds to step S105.

(Step S103): The control unit 12 of the portable device 10 causes the communication unit 13 to transmit, to the vehicle 20, abnormality notification indicating that abnormality has occurred in the motion sensor 11. In this sequence, it is assumed that the portable device 10 is distant from the vehicle 20 in a range where the portable device 10 can communicate with the vehicle 20. When the portable device 10 is outside the range in which the portable device 10 can communicate with the vehicle 20, abnormality notification may not be transmitted. Alternatively, when the portable device 10 enters the range where the portable device 10 can communicate with the vehicle 20 for the immediately following time, abnormality notification may be transmitted.

(Step S104): The communication unit 23 of the vehicle 20 receives the abnormality notification. The control unit 22 of the vehicle 20 causes the notification unit 21 to make notification to the user based on the abnormality notification. This notification can be performed by sound or light from a lamp. Alternatively, display representing abnormality may be indicated on a display. This is the end of the process.

(Step S105): The control unit 12 of the portable device 10 determines whether or not the motion detected in step S101 matches any of one or more predetermined patterns. The predetermined pattern corresponds to an instruction input performed by a user by swinging or tapping on the portable device 10, or a motion state such as user's walking. When the matching pattern can be specified, the control unit 12 performs a process based on the pattern. In a case where the process based on the pattern is, for example, setting of the portable device 10 itself, and notification to the vehicle 20 is not required, the following process steps of step S106 and step S107 are unnecessary, and this is the end of the process. When motion is detected anew, this sequence is repeatedly performed.

(Step S106): In a case where notification to the vehicle 20 is necessary for the process based on the pattern specified in step S105, the control unit 12 of the portable device 10 causes the communication unit 13 to transmit, to the vehicle 20, notification based on the pattern.

(Step S107): The communication unit 23 of the vehicle 20 receives the notification based on the pattern. The control unit 22 of the vehicle 20 performs various control for the vehicle based on the received notification. This is the end of the process. When motion is detected anew, this sequence is repeatedly performed.

The communication unit 13 of the portable device 10 may transmit the abnormality notification to another portable device such as a smartphone of a user in step S103, instead of or in addition to the vehicle 20. Predetermined communication setting is performed in advance between the other portable device and the portable device 10. When abnormality notification is received, a user is notified of the abnormality by sound, vibration, display, or the like. Furthermore, the communication unit 13 may directly notify a user of abnormality by, for example, blinking of a LED. Alternatively, when the vehicle 20 receives abnormality notification, abnormality notification may be transferred to another portable device, and the other portable device may notify the user of the abnormality, instead of or in addition to the user being notified of the abnormality by the notification unit 21.

According to modification of the present embodiment, instead of the control unit 12 of the portable device 10, the control unit 22 of the vehicle 20 may at least partially perform determination as to abnormality in step S102 and the pattern specifying process in S105. In this case, when motion is detected in step S101, the communication unit 13 of the portable device 10 transmits the output value from the motion sensor 11, to the vehicle 20. The control unit 22 of the vehicle 20 can similarly perform determination as to abnormality in step S102 and the pattern specifying process in S105 based on the received output value.

Second Embodiment

A second embodiment of the present invention will be described below in detail with reference to the drawings. The present embodiment is different from the first embodiment in that the portable device 10 determines whether or not abnormality has occurred in the motion sensor 11, in a method different from that in the first embodiment. That is, in the present embodiment, in a case where a stationary state continues for a predetermined time period (second predetermined time period) or longer time period, the portable device 10 performs operation test of the motion sensor 11.

<Process>

Figure 3:
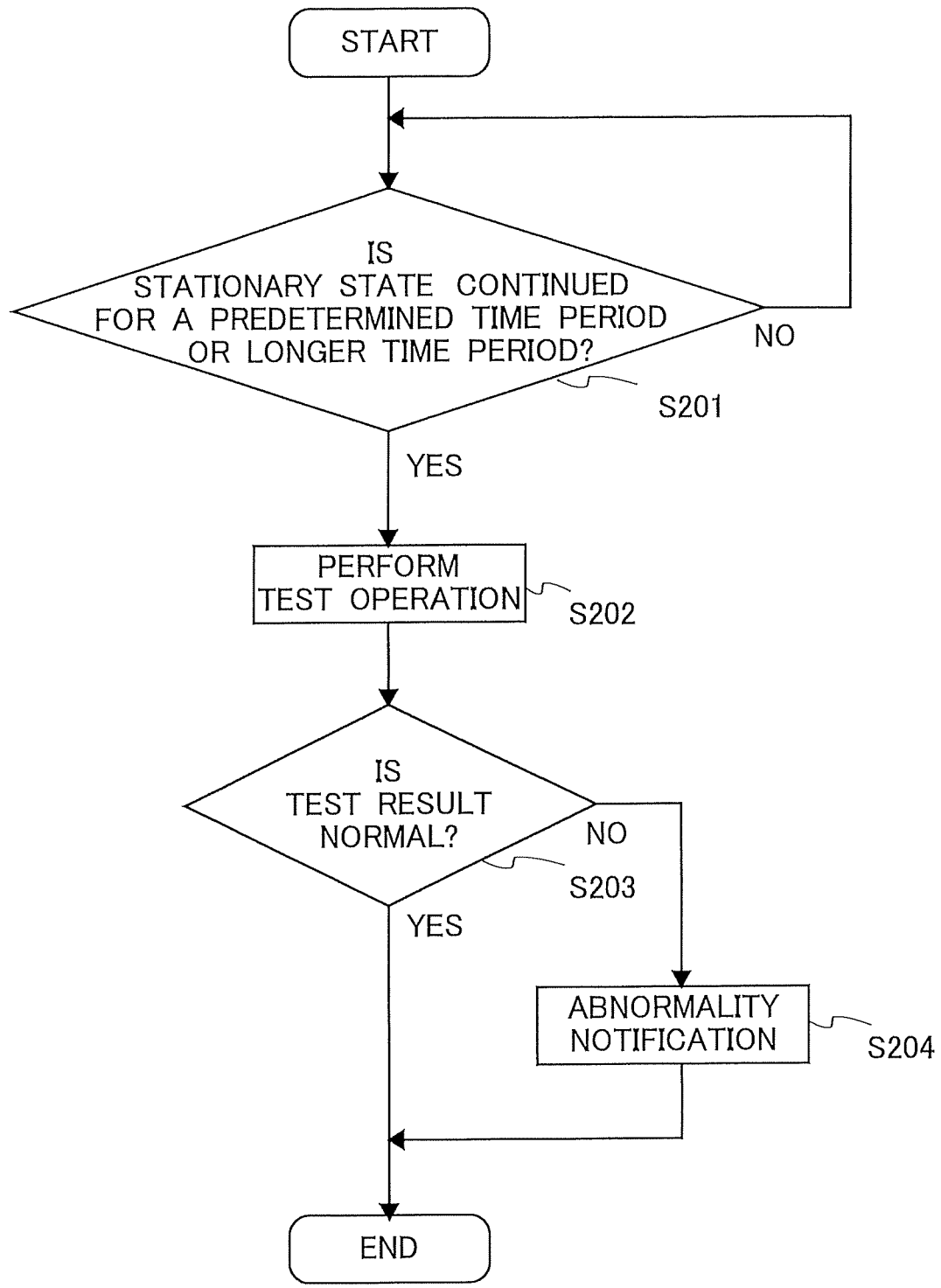
FIG. 3 is a flow chart showing a process according to the second embodiment of the present invention.

An example of the process according to the present embodiment will be described. FIG. 3 is a flow chart showing the process performed by the portable device 10.

(Step S201): While the portable device 10 is operating, the control unit 12 of the portable device 10 monitors the output from the motion sensor 11. In a case where no motion is detected, and it can be determined that the portable device 10 is stationary, a time for which this state continues is counted. For example, in a case where the motion sensor 11 is an acceleration sensor, when the direction of the acceleration is almost constant and the magnitude of the acceleration is almost constant (1 G), the control unit 12 determines that the portable device 10 is stationary. In a case where the stationary state continues for a predetermined time period or longer time period, it is likely that the portable device 10 is not held by a user and is stationary, and the test operation can be performed. In this case, the process proceeds to step S202. In a case where the stationary state has not continued for the predetermined time period or longer time period, the process step of step S201 is repeated.

(Step S202): The control unit 12 of the portable device 10 causes the motion sensor 11 to perform a predetermined test operation. The test operation is a function which is preset in the motion sensor 11. For example, the control unit 12 can cause the motion sensor 11 to perform the test operation by transmitting a predetermined signal to the motion sensor 11.

(Step S203): The control unit 12 of the portable device 10 obtains an output of the result of the test operation of the motion sensor 11, and determines, based on the result, whether the motion sensor 11 is normal or abnormal. Thus, whether or not abnormality has occurred in the motion sensor 11 can be preferably determined. In a case where the obtained test result represents a normal state, the process is ended. In a case where the obtained test result represents abnormality, or a test result that represents a normal state cannot be obtained, the process proceeds to step S204.

(Step S204): The control unit 12 of the portable device 10 causes the communication unit 13 to transmit, to the vehicle 20, abnormality notification indicating that abnormality has occurred in the motion sensor 11. In a case where the portable device 10 is not in a range where the portable device 10 can communicate with the vehicle 20, the abnormality notification may not be transmitted. Alternatively, when the portable device 10 is in the range where the portable device 10 can communicate with the vehicle 20 for the immediately following time, abnormality notification may be transmitted. Furthermore, the portable device 10 may transmit the abnormality notification to another portable device such as a smartphone of a user instead of or in addition to the vehicle 20. When the vehicle 20 has received the abnormality notification, the vehicle 20 may cause the notification unit 21 to make notification to the user. Instead thereof or in addition thereto, abnormality notification may be transferred to another portable device, and the other portable device may notify the user of the abnormality.

This is the end of the process. The present embodiment may be performed in combination with the first embodiment.

(Effect)

Each embodiment of the present invention has been described above. According to these embodiments, in a case where abnormality has occurred in the motion sensor, the abnormality can be detected and a user can be notified of the abnormality. Therefore, a portion at which abnormality has occurred can be quickly specified, and the abnormality can be rectified and canceled.

The present invention is not limited to the portable device and the vehicle. The present invention can be construed as a vehicle system that includes the portable device and the vehicle, a method executed by a computer that configures the components, a program, and a non-transitory computer-readable storage medium having the program stored therein.

The present invention is useful for, for example, a portable device that includes a motion sensor and communicates with a vehicle and the like.

What is claimed is:

1. A portable device that communicates with a vehicle, the portable device comprising:
   a motion sensor;
   a control unit configured to determine whether or not abnormality has occurred in the motion sensor, based on an output from the motion sensor; and
   an output unit configured to perform an output representing abnormality in the motion sensor, when the control unit determines that abnormality has occurred in the motion sensor, wherein
   the motion sensor is capable of detecting an acceleration, and
   the control unit determines that abnormality has occurred in the motion sensor in a case where a state where an absolute value of a difference between a magnitude of an acceleration detected by the motion sensor and a magnitude of a gravitational acceleration is greater than or equal to a predetermined value, continues for a first predetermined time period or longer time period.

2. The portable device according to claim 1, wherein
   the control unit causes the motion sensor to perform a predetermined test operation in a case where an output from the motion sensor indicates that the portable device is stationary for a second predetermined time period or longer time period, and
   whether or not abnormality has occurred in the motion sensor is determined based on a result of the test operation.

3. The portable device according to claim 1, wherein
   the output unit performs wireless communication to transmit, to either or both of the vehicle and another portable device, abnormality notification as the output representing abnormality in the motion sensor.

4. The portable device according to claim 1, wherein
   in a case where the control unit determines that abnormality has not occurred in the motion sensor, and the motion detected based on an output from the motion sensor matches any of one or more predetermined patterns, the control unit performs a process based on the pattern which the motion matches.

* * * * *